(12) United States Patent
Kim

(10) Patent No.: US 10,795,159 B2
(45) Date of Patent: *Oct. 6, 2020

(54) MICRO DISPLAY DRIVING SUBSTRATE FOR HEAD-MOUNTED DISPLAY

(71) Applicant: RAONTECH INC., Seongnam-si, Gyeonggi-do (KR)

(72) Inventor: Min-Seok Kim, Yongin-si (KR)

(73) Assignee: RAONTECH INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,285

(22) Filed: Nov. 29, 2018

(65) Prior Publication Data

US 2019/0094539 A1    Mar. 28, 2019

Related U.S. Application Data

(63) Continuation of application No. 14/034,999, filed on Sep. 24, 2013, now Pat. No. 10,180,573.

(30) Foreign Application Priority Data

Sep. 26, 2012 (KR) .......................... 10-2012-0107075

(51) Int. Cl.
*G02B 27/01* (2006.01)
*G09G 3/3216* (2016.01)
*G09G 5/00* (2006.01)

(52) U.S. Cl.
CPC ......... *G02B 27/017* (2013.01); *G09G 3/3216* (2013.01); *G02B 2027/014* (2013.01); *G09G 5/00* (2013.01); *G09G 2370/08* (2013.01); *G09G 2370/14* (2013.01)

(58) Field of Classification Search
CPC ............ G02B 27/017; G02B 2027/014; G09G 3/3216; G09G 5/00; G09G 2370/08; G09G 2370/14
USPC ......................................................... 345/204
See application file for complete search history.

(56) References Cited

U.S. PATENT DOCUMENTS

| | | | | |
|---|---|---|---|---|
| 5,831,699 A | * | 11/1998 | Wright | ................... H01L 25/167 349/73 |
| 6,545,320 B2 | * | 4/2003 | Ohtani | ................. G02B 27/017 257/350 |
| 10,180,573 B2 | * | 1/2019 | Kim | ..................... G02B 27/017 |
| 2005/0228281 A1 | * | 10/2005 | Nefos | ...................... A61B 8/08 600/446 |

(Continued)

*Primary Examiner* — Chanh D Nguyen
*Assistant Examiner* — Ngan T. Pham-Lu
(74) *Attorney, Agent, or Firm* — IPLA P.A.; James E. Bame

(57) ABSTRACT

A micro display driving substrate for a head-mounted display (HMD) terminal unit worn by a user, comprises: an LCoS (Liquid Crystal on Silicon) pixel array configured of one or more first electrode lines arranged while keeping a predetermined distance and one or more second electrode lines arranged to intersect with the first electrode lines while keeping a predetermined distance; a data driving unit for supplying the video data converted into an analog signal to the first electrode lines of the LCoS pixel array; a line driving unit for receiving the video control signal and providing a line selection signal for selecting a second electrode line; and a support control unit for driving a light source needed to display an image.

3 Claims, 3 Drawing Sheets

(56) References Cited

U.S. PATENT DOCUMENTS

| | | | | |
|---|---|---|---|---|
| 2007/0035493 A1* | 2/2007 | Chang | ............... | G09G 3/003 |
| | | | | 345/87 |
| 2008/0136990 A1* | 6/2008 | Kimura | ............... | H01L 27/1218 |
| | | | | 349/46 |
| 2010/0277519 A1* | 11/2010 | Lee | ............... | G09G 3/3406 |
| | | | | 345/691 |
| 2012/0194510 A1* | 8/2012 | Yun | ............... | G02B 3/08 |
| | | | | 345/419 |
| 2013/0241948 A1* | 9/2013 | Kimura | ............... | G09G 5/006 |
| | | | | 345/589 |
| 2013/0242056 A1* | 9/2013 | Fleck | ............... | H04N 13/296 |
| | | | | 348/47 |
| 2014/0232759 A1* | 8/2014 | Simmonds | ............... | G09G 3/00 |
| | | | | 345/690 |

* cited by examiner

MICRO DISPLAY DRIVING SUBSTRATE FOR HEAD-MOUNTED DISPLAY

CROSS REFERENCE

This is a continuation of application Ser. No. 14/034,999 which is now pending.

BACKGROUND

The present invention relates to a micro display driving substrate for a head-mounted display (HMD) terminal unit worn by a user, and more specifically, to a micro display driving substrate which can reduce weight and volume of a head-mounted display (HMD) terminal greatly and simplify components used in the HMD terminal by embedding HMD terminal devices such as a differential signal receiver, a light source control unit and the like on a driving substrate (a backplane) for HMD display in the form of a head-mounted display.

In implementing a head-mounted display (HMD) using a conventional LCoS panel, a large number of devices such as a data interface, an LED, an audio device (earphone), a power circuit and the like, as well as a micro display, are included in a HMD terminal (glasses). Therefore, a separate video player should transmit light source control signals, audio data and the like to the HMD terminal, in addition to video data and display control signals.

Since the signal form of a data or a control signal input into a display is inappropriate for long distance transmission presently, a differential signal interface IC and peripheral devices for long distance transmission of a video signal are implemented in a terminal (glasses), and the video signal, control signals of the peripheral devices, power and the like converted into differential signals are transmitted from a system to the terminal.

Since a large number of components are installed in a glass unit configured as described above, it is difficult to implement a slim HMD due to increased weight and volume of the glasses, and practicality of the terminal is lowered due to increased thickness of data and power transmission wires.

SUMMARY OF THE INVENTION

Therefore, the present invention has been made in view of the above problems, and it is an object of the present invention to provide a micro display driving substrate which can reduce weight and volume of a HMD terminal and a transmission wire greatly and simplify components used in the HMD terminal by embedding a differential signal receiver in a micro display driving substrate (Backplane) of the HMD terminal unit.

To accomplish the above object, according to one aspect of the present invention, there is provided a micro display driving substrate including: a terminal control unit for receiving a video signal from outside, converting the video signal into a video data and a video control signal for displaying an image, storing the video data and the video control signal, converting the converted video data and video control signal into differential signals and outputting the differential signals; and a HMD terminal unit worn by a user, for receiving the differential signals from the terminal control unit, converting the video data and the video control signal into TTL or LVCMOS signals and displaying the video data.

In addition, the HMD terminal unit may include: an LCoS pixel array configured of one or more first electrode lines arranged while keeping a predetermined distance and one or more second electrode lines arranged to intersect with the first electrode lines while keeping a predetermined distance; a data driving unit for supplying the video data converted into an analog signal to the first electrode lines of the LCoS pixel array; a line driving unit for receiving the video control signal and providing a line selection signal for selecting a second electrode line so that the video data stored on the first electrode lines for a predetermined time period may be transferred to and stored in a pixel of a relevant line; and a support control unit for receiving the video data and the video control signal converted into the differential signals, converting the video data and the video control signal into the TTL or the LVCMOS signals, and providing the video data and the video control signal to the data driving unit and the line driving unit, respectively.

In addition, the HMD terminal unit may form the LCoS pixel array, the data driving unit, the line driving unit and the support control unit to be embedded in one micro display driving substrate.

In addition, the support control unit may include a differential signal receiver unit for receiving the video data and the video control signal converted into the differential signals, converting the video data and the video control signal into the TTL or the LVCMOS signals, and providing the TTL or the LVCMOS_signals to the data driving unit and the line driving unit, respectively.

In addition, the support control unit may include a lens control unit for outputting a lens control signal for controlling a lens arranged in the HMD terminal unit.

In addition, the support control unit may include a light source control unit for driving a light source needed for the LCoS pixel array to display an image, while controlling an on/off time and brightness of the light source.

In addition, the support control unit may include a serial communication unit for supporting a protocol needed between the micro display driving substrate and the terminal control unit through a serial communication.

In addition, the support control unit may include an audio processing unit for processing an audio data provided together with the video data and retransmitting the audio data to the terminal control unit.

In addition, the support control unit may include an RF communication unit for wirelessly transmitting and receiving the video data, the video control signal and a control signal for controlling the HMD terminal unit, which are compressed in a certain format.

In addition, the support control unit may form the differential signal receiver unit, the lens control unit, the light source control unit, the serial communication unit, the audio processing unit and the RF communication unit to be embedded in one micro display driving substrate.

In addition, the differential signal receiver unit may store the video data and the video control signal converted into the TTL or the LVCMOS signals for a predetermined time period.

In addition, the differential signal receiver unit may simultaneously provide the video data and the video control signal converted into the TTL or the LVCMOS signals and stored for a predetermined time period to the data driving unit and the line driving unit.

In addition, the terminal control unit may include an image conversion unit for converting various types of video formats into a relevant format when a video signal is provided from outside.

DETAILED DESCRIPTION OF THE PREFERRED EMBODIMENT

The preferred embodiments of the invention will be hereafter described in detail, with reference to the accompanying drawings.

Figure 1:
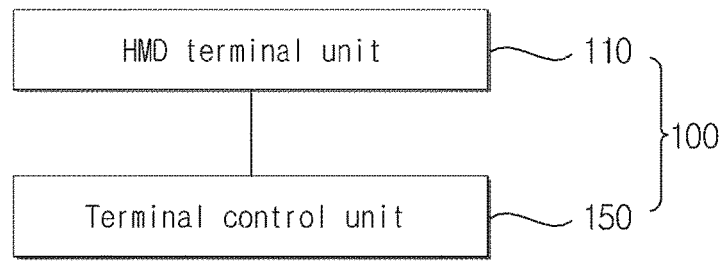
FIG. 1 is a block diagram showing a HMD system display using micro display driving substrate according to an embodiment of the present invention.
Figure 2:
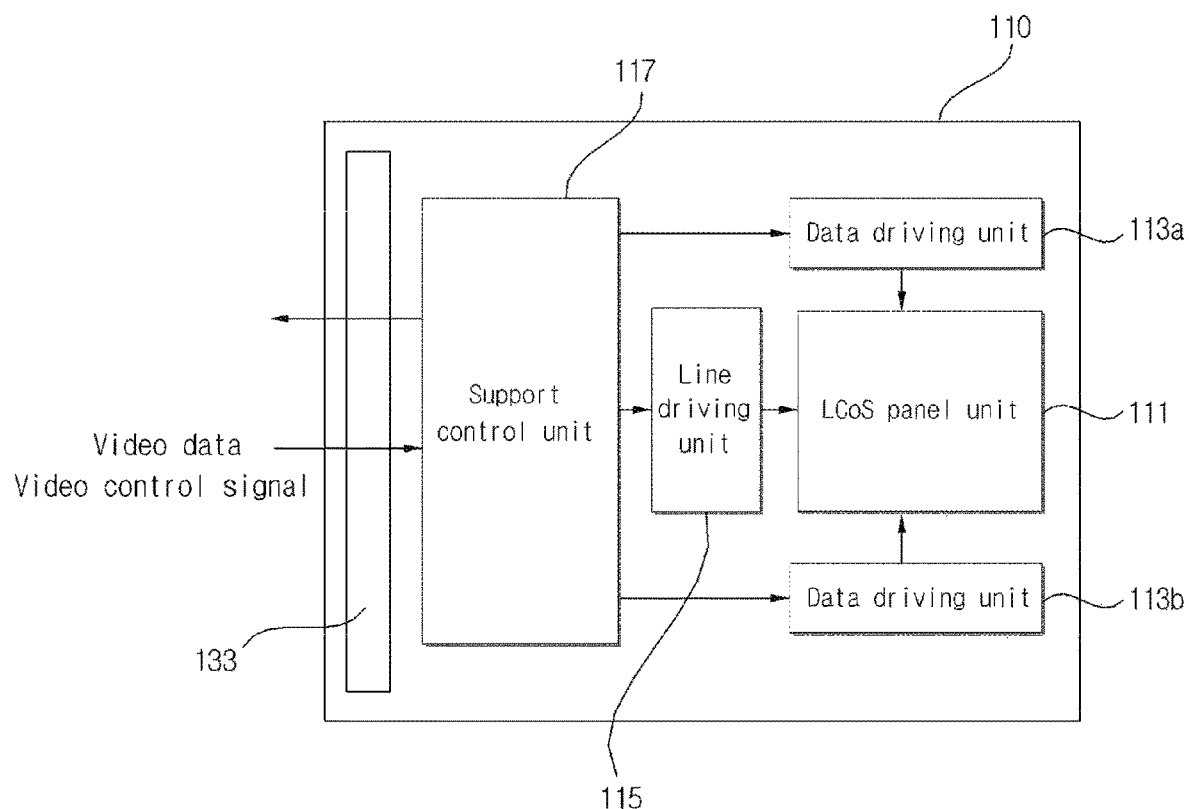
FIG. 2 is a block diagram showing a micro display driving substrate (Backplane) in a HMD terminal unit according to an embodiment of the present invention.
Figure 3:
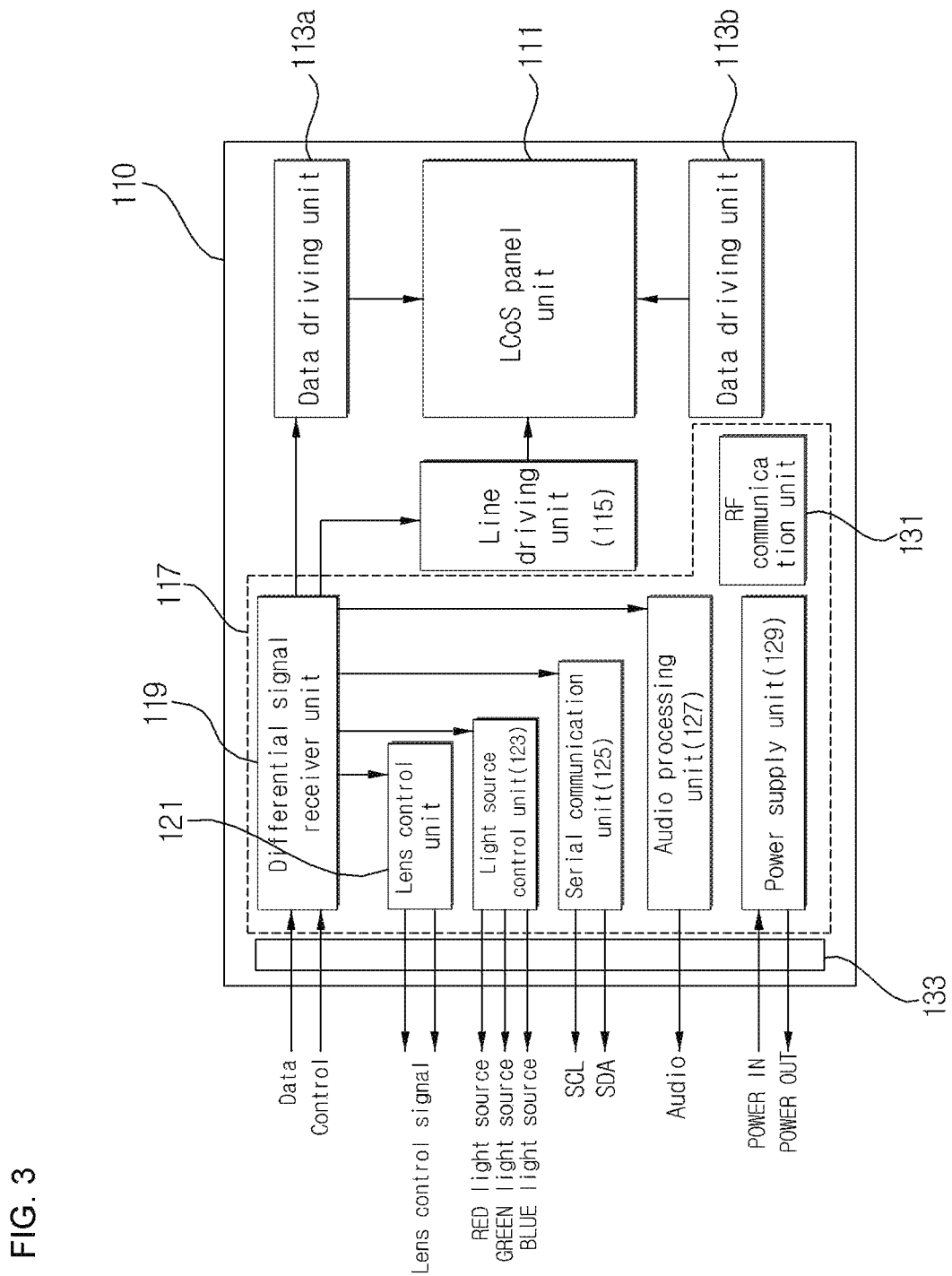
FIG. 3 is a detailed block diagram showing a micro display driving substrate (Backplane) in a HMD terminal unit according to an embodiment of the present invention.
Figure 4:
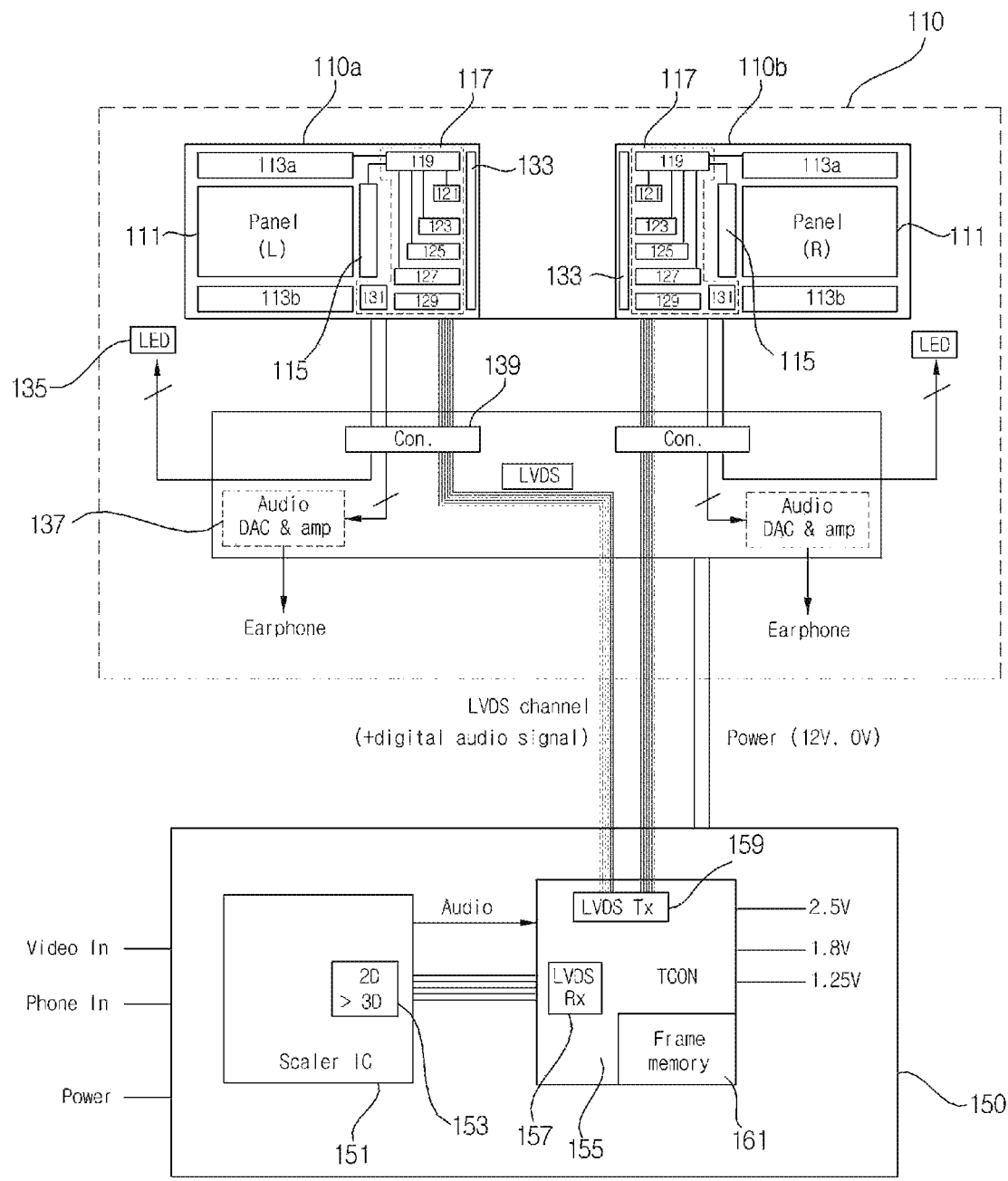
FIG. 4 is a detailed block diagram showing a HMD system using a micro display driving substrate according to an embodiment of the present invention.

FIG. 1 is a block diagram showing a HMD system using a micro display driving substrate according to an embodiment of the present invention, FIG. 2 is a block diagram showing a micro display driving substrate (Backplane) in a HMD terminal unit according to an embodiment of the present invention, FIG. 3 is a detailed block diagram showing a micro display driving substrate (Backplane) in a HMD terminal unit according to an embodiment of the present invention, and FIG. 4 is a detailed block diagram showing a HMD display system using a micro display driving substrate and LED light source according to an embodiment of the present invention.

Referring to FIGS. 1 to 4, the micro display driving substrate according to an embodiment of the present invention includes a terminal control unit 150 and a HMD terminal unit 110.

The terminal control unit 150 receives a video signal from outside, converts the video signal into a video data and a video control signal for displaying an image, stores the video data and the video control signal, converts the converted video data and video control signal into differential signals and outputs the differential signals. The terminal control unit 150 may have one or more terminals to be connected to outside. A variety of video signals may be received through the plurality of terminals. For example, the terminal control unit 150 may be connected to external video devices capable of outputting a video, such as a DVD player, a notebook computer, a smart phone, a camera and the like, through the terminals and receive a variety of video signals.

In addition, the terminal control unit 150 includes a video conversion unit 151 which can convert various types of video formats into a relevant format when a video signal is received from outside.

The video conversion unit 151 may convert various types of video formats input from outside into a relevant format desired by a user. That is, if a two-dimensional video signal among the various types of video formats is provided, the video conversion unit 151 may use the two-dimensional video signal as is or convert the two-dimensional video signal into a three-dimensional video signal, and if a three-dimensional video signal among the various types of video formats is provided, the video conversion unit 151 may use the three-dimensional video signal as is or convert the three-dimensional video signal into a two-dimensional video signal. A video format corresponding to a user may be converted diversely.

In addition, the terminal control unit 150 includes a differential signal conversion unit 155 for converting the video data and the video control signal respectively converted into a corresponding format 153 into differential signals.

The differential signal conversion unit 155 may include a differential signal reception unit 157 for receiving the video data and the video control signal respectively converted into a corresponding format 153 and a differential signal transmission unit 159 for supplying the video data and the video control signal converted into differential signals.

The differential signal conversion unit 155 supplies the video data and the video control signal converted into the differential signals to the HMD terminal unit 110, which will be described below, through the differential signal transmission unit 159.

In addition, the terminal control unit 150 may include a video signal storage unit 161 for temporarily storing the video data and the video control signal converted into the differential signals.

Here, the differential signal includes a Low Voltage Differential Signal (LVDS). Such a differential signal does not express a data as a voltage level of a signal in transmitting and receiving a digital signal, but it is s digital transmission method which converts a voltage difference into a data and transmits the data. That is, when a data is transmitted as a simple voltage level expressed by "0" or "1", it is difficult to transmit the data at a high speed since a signal may be delayed due to a noise occurred with respect to a reference voltage. Therefore, the data may be transmitted as a difference signal using a voltage difference, not a simple voltage level expressed by "0" or "1".

Like this, if a data is transmitted as a differential signal using a voltage difference, signal delay may be prevented since the noise occurred with respect to a reference voltage is relatively small. Accordingly, the data may be rapidly and correctly transmitted at a high speed.

As described above, since the terminal control unit 150 converts all control signals provided to the HMD terminal unit 110 such as a light source control signal, an audio signal and the like into differential signals using a voltage difference and outputs the converted differential signals, analog audio transmission lines can be removed, and, in addition, burdens of installing a transmission cable can be remarkably reduced. Accordingly, all the control signals provided to the HMD terminal unit 110 can be rapidly and correctly transmitted without a noise using a low power.

A user wears the HMD terminal unit 110, and the HMD terminal unit 110 receives the differential signals from the terminal control unit 150, converts the video data and the video control signal into TTL or LVCMOS signals and displays the video data. The HMD terminal unit 110 includes a micro display with an LCoS panel unit 111, data driving units 113a and 113b, a line driving unit 115 and a support control unit 117, and LED light source 135.

The LCoS pixel array 111 is configured of one or more first electrode lines arranged while keeping a predetermined distance and one or more second electrode lines arranged to intersect with the first electrode lines while keeping a predetermined distance. Such an LCoS pixel array 111 is provided with the video data through the first electrode lines and a line selection signal through the second electrode lines and displays the video data.

In addition, a light source element, such as an LED, a laser diode or the like capable of rapidly turning on and off a control signal so that a user may smoothly enjoy a clear image, may be applied to an optical system which can view the video of the micro display.

The data driving units 113a and 113b supply a video data converted into an analog signal to the first electrode lines of the LCoS pixel array 111. The data driving units 113a and 113b may receive the video data and the video control signal from a differential signal receiver unit 119 described below, store the converted video data on the first electrode lines for a predetermined time period, and simultaneously provide the converted video data to all pixels selected by line selection signal through the first electrode lines.

The line driving unit 115 receives the video control signal and provides a selection signal for selecting a second electrode line so that the video data stored on the first electrode lines for a predetermined time period may be transferred to and stored in a pixel of a relevant line. At this point, the line driving unit 115 may be provided with the video control signal from the differential signal receiver unit 119 which will be described below.

The support control unit 117 receives the video data and the video control signal converted into differential signals, converts the video data and the video control signal into TTL or LVCMOS signals, and provides the converted video data and the converted video control signal to the data driving units 113a and 113b and the line driving unit 115, respectively. Such a support control unit 117 includes a differential signal receiver unit 119, a lens control unit 121, a light source control unit 123, a serial communication unit 125, an audio processing unit 127 and an RF communication unit 131.

The differential signal receiver unit 119 receives the video data and the video control signal converted into the differential signals, converts the video data and the video control signal into TTL or LVCMOS signals, and provides the converted video data and the converted video control signal to the data driving units 113a and 113b and the line driving unit 115, respectively. At this point, after receiving the video data and the video control signal converted into differential signals, converting the converted video data and the video control signal into TTL or LVCMOS signals, and storing the video data and the converted video control signal for a predetermined time period, the differential signal receiver unit 119 provides the video data and the video control signal converted into the TTL or LVCMOS signals to the data driving units 113a and 113b and the line driving unit 115, respectively.

That is, when the video data and the video control signal are applied to the LCoS pixel array 111, the differential signal receiver unit 119 may temporarily store the video data sequentially input into a pixel array formed of the first electrode lines and the second electrode lines for a line data transmission time period and then provide the video data to the LCoS pixel array through the first electrode lines.

Since the video data sequentially input for each pixel are provided through the first electrode lines after being stored for one line data transmission time period and a selection signal synchronized with the video data is provided to the second electrode lines as described above, the video data and the video control signal may be sequentially provided to all the first electrode lines and the second electrode lines.

In addition, the differential signal receiver unit 119 may receive not only the video data and the video control signal converted into differential signals from the terminal control unit 150, but also signals for controlling various circuits needed for the HMD terminal unit 110, such as the lens control unit 121, the light source control unit 123, the serial communication unit 125, the audio processing unit 127 and the RF communication unit 131, which are converted into differential signals. Like this, since the differential signal receiver unit 119 receives various control signals converted into differential signals, i.e., peripheral circuit control signals that should be transmitted through separate TTL or LVCMOS transmission lines, together with the video signal, the number of interface lines connected to the HMD terminal unit 110 can be remarkably reduced.

In addition, since the HMD terminal unit 110 forms the LCoS pixel array 111, the data driving units 113a and 113b, the line driving unit 115 and the support control unit 117 the differential signal receiver unit 119, the lens control unit 121, the light source control unit 123, the serial communication unit 125, the audio processing unit 127 and the RF communication unit 131, which are formed in the support control unit 117, to be embedded in a micro display driving substrate 120 serving as a backplane and being provided in the HMD terminal unit 110, the number or size of peripheral components that should be installed in or engaged with the HMD terminal unit 110 can be reduced. Accordingly, the overall weight, as well as the cost, of the HMD terminal unit 110 can be lowered.

In addition, the HMD system 100 using the micro display driving substrate according to an embodiment of the present invention may embed the differential signal receiver unit 119 in the micro display driving substrate 120 serving as a backplane to easily substitute a differential signal receiver IC for the HMD terminal unit 110. In addition, the support control unit 117 including the differential signal receiver unit 119 can be efficiently integrated. Accordingly, the weight and volume of the HMD terminal unit 110, which hinder practicality of the HMD terminal unit 110, can be drastically reduced.

The lens control unit 121 is connected to the differential signal receiver unit 119 and outputs a lens control signal for controlling a lens arranged in the HMD terminal unit 110. The lens control unit 121 may output a lens control signal for controlling a lens arranged in the HMD terminal unit 110 according to surrounding environments or selection of a user.

The light source control unit 123 is connected to the differential signal receiver unit 119 and may drive a light source needed for the LCoS pixel array 111 while controlling the on/off time and brightness of the light source. That is, when a Field Sequential Color (FSC) is implemented using an LED light source, the light source control unit 123 may generate an on/off signal and adjust brightness for each of RGB using a counter and a logic circuit based on an on/off signal inputted for the LED light source.

Accordingly, the light source control unit 123 may generate a variety of colors by controlling the on/off time of a red light source, a green light source and a blue light source. Accordingly, the LCoS pixel array 111 may display an image in a variety of colors.

In addition to generating an on/off signal of the light source of each color, the light source control unit 123 may connect to a power supply unit and adjust driving voltage and current of an RGB LED.

The serial communication unit 125 supports a protocol needed between a micro display driving substrate 120 and the terminal control unit 150 through a serial communication. That is, the serial communication unit 125 may easily and correctly support a protocol needed between a micro display driving substrate 120 and the terminal control unit 150 using a serial data line (SDA) and a serial clock line (SCL) through the differential signal receiver unit 119.

The audio processing unit 127 processes an audio data provided from the differential signal receiver unit 119 and retransmits the audio data to an audio digital-to-analog converter (DAC) and a user. That is, the audio processing unit 127 may process the audio data input from the differential signal receiver unit 119 through an LVDS line for transmitting the video signal and retransmit the audio data to an audio DAC and a user. For example, if a 24-bit serial data is input into the audio processing unit 127, the audio processing unit 127 may convert the serial data into a pulse code modulation (PCM) data and output the PCM data.

The RF communication unit 131 may wirelessly transmit and receive a video data, a video control signal and a control signal for controlling the HMD terminal unit 110, which are compressed in a certain format. That is, the video data and the video control signal wirelessly received through the RF communication unit 131 may substitute for the video data and the video control signal converted into differential signals and received through the differential signal receiver unit 119. Accordingly, since the RF communication unit 131 may substitute for the differential signal receiver unit 119 to be equal in practice, it may transfer the video data and the video control signal to the data driving units and the line driving unit and provide a control signal for controlling the HMD terminal unit 110 to the lens control unit 121, the light source control unit 123, the serial communication unit 125 and the audio processing unit 127.

In addition, the RF communication unit 131 may be set using either the video data or the video control signal received from the differential signal receiver unit 119.

In addition, the RF communication unit 131 may be embedded in the micro display driving substrate 120. Like this, if the RF communication unit 131 is embedded in the micro display driving substrate 120, a wireless HMD can be implemented.

The power supply unit 129 may be electrically connected to and provide power to the differential signal receiver unit 119, the lens control unit 121, the light source control unit 123, the serial communication unit 125, the audio processing unit 127 and the RF communication unit.

Since a HMD system 100 using the micro display driving substrate according to an embodiment of the present invention described above integrates the LCoS pixel array 111, with the data driving units 113a and 113b and the line driving unit 115 for driving the LCoS pixel array 111 on one (micro) display driving substrate (backplane) to be embedded in one (micro) display driving substrate 120, weight and volume of the glasses which hinder practicality of the HMD terminal unit 110 can be drastically reduced.

Furthermore, since the constitutional components used in the HMD system 100 using the micro display driving substrate according to an embodiment of the present invention described above are integrated and simplified, the number of the components and the manufacturing cost thereof can be remarkably reduced.

Since the HMD system 100 using the micro display driving substrate according to an embodiment of the present invention may embed various devices needed for the HMD terminal unit 110 on a driving substrate (a backplane) 120 of the micro display driving substrate and transfer a signal and data for driving the peripheral devices at a low voltage and a high speed through differential signals, volume of a cable can be reduced, and, in addition, noise can be suppressed, and EMI can be blocked.

Further, since the micro display driving substrate according to an embodiment of the present invention embeds a differential signal receiver in the HMD terminal unit 110, weight and volume of glasses which hinder practicality of the HMD terminal unit can be drastically reduced. Accordingly, since the components used in the micro display driving substrate are simplified, the number of the components and the manufacturing cost thereof can be remarkably reduced.

Further, since the micro display driving substrate according to an embodiment of the present invention can minimize the weight and volume in manufacturing the HMD terminal unit, practicality of the HMD terminal unit can be improved. Furthermore, it is possible to improve cost competitiveness, reduce manufacturing cost and secure throughput owing to the simplified system.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A micro display driving substrate for a head-mounted display (HMD) terminal unit worn by a user, the micro display driving substrate comprising:

an LCoS (Liquid Crystal on Silicone) pixel array configured of one or more first electrode lines arranged while keeping a predetermined distance and one or more second electrode lines arranged to intersect with the first electrode lines while keeping a predetermined distance;

a data driving circuit for supplying the video data converted into an analog signal to the first electrode lines of the LCoS pixel array;

a line driving circuit for receiving the video control signal and providing a line selection signal for selecting a second electrode line so that the video data stored on the first electrode lines for a predetermined time period may be transferred to and stored in a pixel of a relevant line; and a support control circuit for driving a light source needed to display an image, while controlling an on/off time and brightness of the light source, the support control circuit including a lens control circuit for outputting a lens control signal for controlling a lens arranged in the HMD terminal unit, a light source control circuit for driving a light source needed to display an image, while controlling an on/off time and brightness of the light source, a differential signal receiver circuit for receiving the video data and the video control signal converted into the differential signals, converting the video data and the video control signal into transistor-transistor logic (TTL) or low voltage complementary metal oxide semiconductor (LVCMOS) signals, and providing the TTL or LVCMOS signals to the data driving circuit and the line driving circuit, respectively, a serial communication circuit for supporting a protocol needed between the micro display driving substrate and the terminal control circuit through a serial communication, an audio processing circuit for processing an audio data provided together with the video data and retransmitting the audio data to an audio digital to analog converter and a user, a radio frequency (RF) communication circuit for wirelessly transmitting and receiving the video data, the video control signal and a control signal for controlling the HMD terminal unit, which are compressed in a certain format, wherein the support control circuit forms the differential signal receiving circuit, the lens control circuit, the light source control circuit, the serial communication circuit, the audio processing circuit, and the RF communication circuit to be embedded in the micro display driving substrate; and wherein the LCoS pixel array, the data driving circuit, the line driving circuit and the support control circuit to be embedded in the micro display driving substrate.

2. The micro display driving substrate according to claim 1, wherein the differential signal receiver circuit stores the video data and the video control signal converted into the TTL or the LVCMOS signals for a predetermined time period.

3. The micro display driving substrate according to claim 1, wherein the differential signal receiver circuit simultaneously provides the video data and the video control signal converted into the TTL or the LVCMOS signals and stored for a predetermined time period to the data driving unit and the line driving unit.

* * * * *